Aug. 22, 1933.  J. A. H. BARKEIJ  1,923,808
CRANK SHAFT LUBRICATION
Filed Jan. 8, 1927
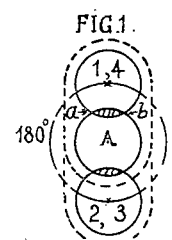
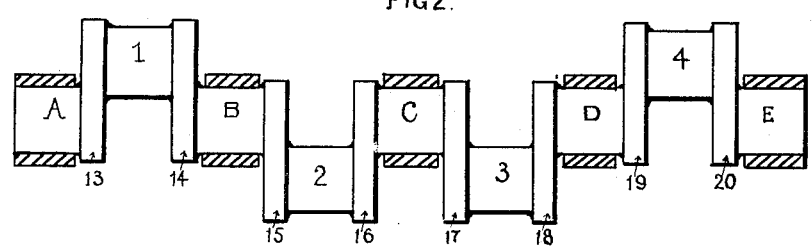
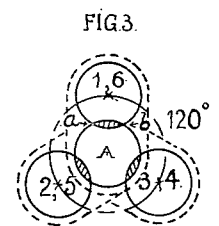
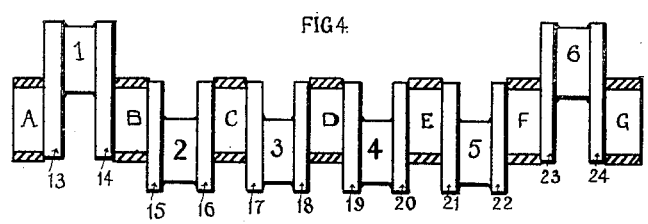
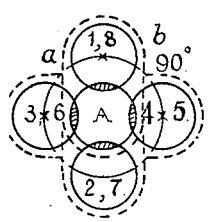
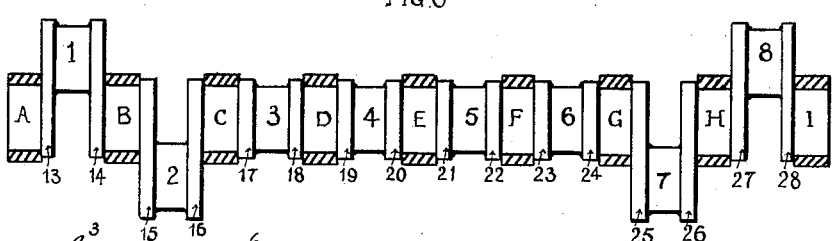
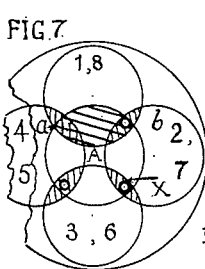
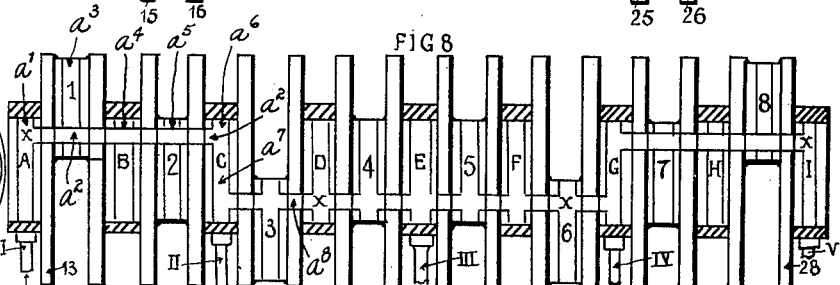
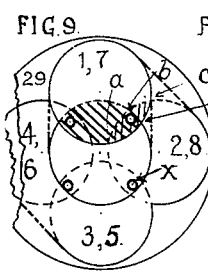
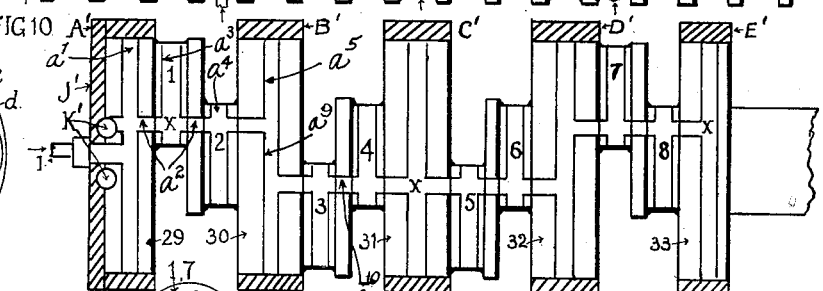
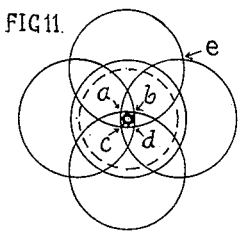
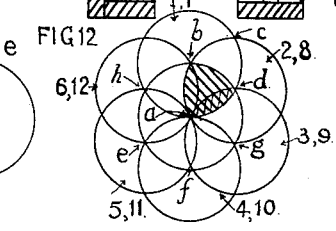
INVENTOR.
J. A. H. Barkeij Patented Aug. 22, 1933

1,923,808

UNITED STATES PATENT OFFICE 1,923,808

CRANK-SHAFT LUBRICATION

Jean A. H. Barkeij, Los Angeles, Calif.

Application January 8, 1927. Serial No. 162,920

5 Claims. (Cl. 184—6)

My first object is to lead oil under pressure to the bearings of the journal pins of a crankshaft, to lead it from said bearings into the journal pins to a point between the surface and the axis of said journal pins and from there to the surface of one or more adjacent crankpins.

My second object is to effect the first object in a crankshaft, in which the crank pins and journal pins are in overlapped relation to each other to facilitate the application of said first object in a practical construction and embodiment of said first object.

My third object is to embody said first object in a crankshaft in which the intermediate crankarms or crankwebs are formed by the intermediate journal pins.

My fourth object is to construct the adjacent crankpins in such a position that the first object can be incorporated to a better advantage, the oil conduit from one crankpin to the adjacent one being as far removed from the axis of the crankshaft as possible.

My fifth object is to construct said first object in a shaft of which the adjacent crankpins are in overlapped relation.

Considering the Figs. 1 to 12, Figs. 1, 3, 5, 7, 9, 11, and 12 are end views of the relative positions of the pins, Figs. 2, 4, 6, 8, 10 are side views of the relative position of the pins and arms. The numbers 1 to 12, represent the crank pins, the numbers 13 to 28 the arms, the capital letters the journal pins, and the small letters the overlapping areas of the pins as seen in end view in the first category of figures. In Figs. 1, 3 and 5 the overlapping area $a$—$b$ of the crank pins and journal pins is considered to give a stronger and stiffer crankshaft for any given H. P. notwithstanding the increased centrifugal force, for any number of crank throws of three or more.

The overlapping of the crank pins $a$ to $c$, as seen in Fig. 9 requires an increase of the pin diameter. The consequent elimination of intermediate bearings, however, is considered to give a stronger and stiffer crankshaft, with more resistance against torsional vibration for any given H. P. and for any number of cranks of 8 or more.

The overlapping area $a$—$b$—$c$—$d$ of the crank pins and journal pins, as seen in Fig. 11, where the overlapping is continuous in a straight line for the entire shaft, is considered to be a better construction for any number of cranks of 8 or more.

The increase in weight of the big end and lower end of the connecting rod has to be considered in the final construction of a shaft based on the continuity principle proposed in this and the co-pending application.

The overlapping of the crank pins and of the crank pins and journal pins shown in Fig. 12 for a straight 12 cylinder engine are the same as those shown in my co-pending application, Ser. No. 711,446, and do not need further explanation, except for the fact that a throw of two adjacent crank pins will have in common the area $a$—$b$—$d$ and a throw of three adjacent crank pins will have in common the overlapping area $a$—$d$.

In Fig. 8 it is proposed to overlap the pins and at the same time to construct the arms in the form of thin discs, amounting to 16 for an eight cylinder engine and forming a crankshaft which does not need a flywheel behind the last disc 28, the flywheel having to bear the brunt of all the inertia forces heaped up in all the other discs and pins.

In Fig. 10 the number of discs is decreased to 5 and are broadened on the circumference, furnishing a bearing surface. The circumferential speed of the discs 29 to 33 is considerable and a very efficient lubrication system is provided as shown in Figs. 8 and 10. The overlapping of the pins eliminates a number of curves necessary in the oil ducts and has a very favorable influence on the final pressure of the oil in all the bearings. The construction of Fig. 8 shows the oil forced from the five bearings to the other bearings and in Fig. 10 from the central bearing or from the front end of the shaft to all the other ones. The arrangement of the pins shown in Fig. 9 is preferred since the central bearing is subject to a comparatively low pressure as explained in my applications No. 14,401, No. 46,679 and No. 58,445. All the oil ducts are rotated on the plane of the papers for the sake of clear illustration.

It is understood that the bearings A' to E' can be constructed of any standard design and that the thrust bearings J' can be a ball bearing as shown at K' or any suitable type of roller bearing, and that the shaft can be placed so, that removal is possible without demounting the crankcase, as shown in my Patent No. 1,595,372. The continuity principle of overlapping can be used in rotary motors and radial motors.

Figs. 7 and 8 show an eight cylinder crankshaft in which the intermediate crankwebs are formed by discs, to decrease torsion and torsional vibrations in the engine.

Figs. 9 and 10 show an eight cylinder crankshaft in which the intermediate crankarms or crankwebs are entirely omitted, the crank pins being connected to each other by journal pins having a circumference, which circumscribes the crank pins.

In Fig. 8 a radial oil lead or conduit $a^1$ in the journal pin A, connects with an oil lead or conduit $a^2$ parallel to the shaft axis. This second oil conduit connects with the radial oil lead or conduit $a^3$ in the crank pin 1. From $a^2$ to the end of $a^3$ the centrifugal force again increases the oil pressure. In the particular arrangement of overlapping pins as shown in Fig. 8 the oil conduit from the journal pin bearing to the crankpin bearing has only two curves of 90°. If the overlapping area is small as shown in Figs. 1 to 6, this oil conduit would have four curves of 90°.

As shown in Fig. 8, the conduit $a^2$ (parallel to shaft axis) can continue straight for two crank pins and three journal pins, connecting respectively with the radial oil holes $a^1$, $a^4$, $a^6$ in the journal pins and $a^3$, $a^5$ in the crankpins. In the journal pin C the oil lead or conduit $a^2$ connects with the parallel oil lead or conduit $a^8$ by a conduit $a^7$.

In Fig. 10 the same arrangement obtains. The radial oil lead or conduit $a^1$ meets the oil lead or conduit $a^2$ within the radius of the journal pin 29 which is here considerably greater than in Figs. 1-8. The oil lead or conduit $a^2$ connects again with the radial oil leads $a^3$ and $a^4$ of the crank pins, and the radial oil lead $a^5$ of the journal pins 30, in which latter journal pin, the oil conduit $a^2$ connects with an oil lead or conduit $a^9$, and further, with a second conduit $a^{10}$ in the next four crank pins.

The aforesaid overlapping pin arrangement can be applied with a small number of oil leads and a small number of curves, avoiding always, between two adjacent pins, at least two 90° curves. It is understood that the oil pressure at the bearing surface is in continuous or interrupted communication with the radial conduits in said crank pins and journal pins, as is well known in the prior art.

I claim:

1. In a crankshaft, the combination of a journal pin connected by a crank arm to a crank pin, said pins rotating in plain bearings located in an engine, an oil conduit to the bearing of said journal pin, said oil conduit communicating with an oil conduit in said journal pin at a point between the surface and center of said journal pin, said second conduit connecting with a third conduit leading to the surface of said crankpin, and means to force under pressure oil to said journal-pin-bearing.

2. A crankshaft consisting of a multiplicity of crankpins and journal pins, said journal pins having a circumference circumscribing that of the crankpins as seen in end view, said journal pins forming the connection between said crankpins, said journal pins rotating in bearings located in an engine of the reciprocating type, an oil conduit to at least one of said bearings, said oil conduit communicating with an oil conduit in said journal pins, said second conduit extending from the surface of said journal pins to a point between said surface and the center of said journal pins, said second conduit communicating with the surface of one or more of said crankpins, the surface of said crankpins located between the surface of said journal pins and the center thereof, as seen in end view.

3. The combination of claim 2 in which the longitudinally neighbour-crankpins are in overlapped relation with each other.

4. In a reciprocating engine, a crankshaft, reciprocating a piston by means of a connecting rod and a crank on said shaft, said crank connected with a journal pin, a continuous oil lead from a point on the surface of said crankpin to a point on the surface of said journal pin, said oil lead being entirely outside the axis of said shaft.

5. The combination of claim 4, combined with means to introduce the lubricating oil at the periphery of said journal pin.

J. A. H. BARKEIJ.